US005700609A

United States Patent [19]

Matsuda et al.

[11] Patent Number: 5,700,609

[45] Date of Patent: Dec. 23, 1997

[54] METHOD OF MANUFACTURING DISPLAY SCREEN

[75] Inventors: Hidemi Matsuda, Fukaya; Takeo Itou, Kumagaya; Tomoko Nakazawa, Maebashi, all of Japan

[73] Assignee: Kabushiki Kaisha Toshiba, Kawasaki, Japan

[21] Appl. No.: 577,095

[22] Filed: Dec. 22, 1995

[30] Foreign Application Priority Data

Dec. 26, 1994 [JP] Japan .................................... 6-322065

[51] Int. Cl.$^{6}$ ........................................ G02B 5/20

[52] U.S. Cl. ........................................ 430/27

[58] Field of Search .................................. 430/7, 27, 321

[56] References Cited

U.S. PATENT DOCUMENTS

| | | | |
|---|---|---|---|
| 2,959,483 | 11/1960 | Kaplan | 430/27 |
| 3,114,065 | 12/1963 | Kaplan | 313/472 |
| 3,891,440 | 6/1975 | Gallaro et al. | 430/27 |
| 5,340,673 | 8/1994 | Tateyama et al. | 430/23 |
| 5,476,737 | 12/1995 | Kusunoki et al. | 430/23 |

FOREIGN PATENT DOCUMENTS

| | | |
|---|---|---|
| 0 647 690 | 4/1995 | European Pat. Off. . |
| 2.225.836 | 11/1974 | France . |
| 5-275007 | 10/1993 | Japan . |

*Primary Examiner*—John A. McPherson
*Attorney, Agent, or Firm*—Cushman Darby & Cushman IP Group of Pillsbury Madison & Sutro LLP

[57] ABSTRACT

A method of manufacturing a display screen provided with a filter pattern comprising a first pigment pattern and a second pigment pattern, which comprises the steps of, forming a first pigment layer by coating a solution containing a first pigment on a surface of a substrate and drying the resultant coated layer, forming a first pigment pattern by subjecting the first pigment layer to a patterned light exposure and developing the resultant exposed pattern, forming a second pigment layer by coating a solution containing a second pigment on the surface of the substrate including a surface of the first pigment pattern, and forming a second pigment pattern by selectively removing, through rinsing, a portion of the second pigment layer which is disposed on the first pigment pattern. At least either one of the solution containing a first pigment and the solution containing a second pigment contains an adhesion regulating agent so as to cause the adhesion strength between the first pigment pattern and the second pigment layer to become lower than the adhesion strength between the substrate and the second pigment layer, thus allowing a portion of the second pigment layer formed on the first pigment pattern to be selectively removed.

14 Claims, 2 Drawing Sheets

METHOD OF MANUFACTURING DISPLAY SCREEN

BACKGROUND OF THE INVENTION

1. Field of the Invention

This invention relates to a method of manufacturing a display screen, and in particular to a method of manufacturing a display screen provided with a filter pattern.

2. Description of the Related Art

The face-plate of color picture tube is provided on its inner surface with a fluorescent material layer of dot or stripe pattern which is capable of emitting red, blue and green light. When an electron beam is impinged upon the fluorescent material layer, the fluorescent material layer emits specific colors thus displaying an image. There have been proposed various improvements of the fluorescent material layer of such a color picture tube in an attempt to improve the quality of display image such as contrast or color purity of the image. For example, there has been proposed a filter-attached fluorescent material layer provided with a pigment layer having the same body colors each corresponding to the emitting colors of the fluorescent material layer, the pigment layer being disposed between a face-plate and the fluorescent material layer. According this filter-attached fluorescent material layer, a red pigment disposed as a filter selectively absorbs green and blue light components from the incident light, likewise a blue pigment selectively absorbs green and red light components, and a green pigment selectively absorbs blue and red light components, so that the quality of display image such as contrast or color purity of the image can be improved.

As for the method of manufacturing such a filter-attached fluorescent material layer, there is suggested a method as disclosed for example in Japanese Patent Unexamined Publication Hei/5-275008. According to this method, a resist is coated on a substrate, the surface of the resultant resist layer excluding a prescribed portion is exposed to light and then developed thus forming a resist pattern. Then, after a pigment solution is coated over the resist pattern, the resist pattern is removed through an acid hydrolysis together with the portion of the pigment layer coated on the resist pattern, thereby forming a pigment pattern in place. This process is repeated for each color to obtain a pigment pattern of respective color.

However, since the resist pattern is required to be formed every time each pigment pattern is to be formed according to this conventional method, the number of process is inevitably increased. Therefore, there has been a demand to simplify the manufacture of the filter pattern.

There has been also proposed another method of forming a pigment pattern as disclosed for example in Japanese Patent Unexamined Publication Hei/5-275007. According to this method, a pigment-dispersed solution comprising a water-soluble polymer such as polyvinyl alcohol (PVA) or polyvinyl pyrrolidone (PVP), and a crosslinking agent such as ammonium dichromate (ADC) or diazonium salt is coated on a substrate to form a pigment layer, which is then subjected to light exposure and developed using a hot water, thereby forming a prescribed pattern of pigment.

However, since the processes of light exposure and development are required to be repeated every time each color pigment pattern is to be formed in this conventional method, the same problem as mention above is also accompanied in this method.

SUMMARY OF THE INVENTION

Accordingly, an object of the present invention is to provide a method of manufacturing a display screen which makes it possible to form a filter pattern in high yield and in a simplified process.

Namely, according to the present invention, there is provided a method of manufacturing a display screen provided with a filter pattern comprising a first pigment pattern and a second pigment pattern, which comprises the steps of; forming a first pigment layer by coating a solution containing a first pigment on a surface of a substrate and drying the resultant coated layer; forming a first pigment pattern by subjecting the first pigment layer to a patterned light exposure and developing the resultant exposed pattern; forming a second pigment layer by coating a solution containing a second pigment on the surface of the substrate including a surface of the first pigment pattern; and forming a second pigment pattern by selectively removing, through rinsing, a portion of the second pigment which is disposed on the first pigment pattern; an adhesion regulating agent being contained in at least either one of the solution containing a first pigment and the solution containing a second pigment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

Figure 1A:
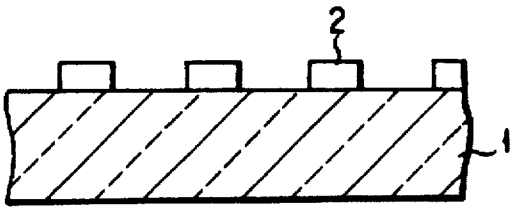
FIGS. 1A to 1J illustrate a process of forming a filter pattern according to this invention.

This invention provides a method of manufacturing a display screen which makes it possible to form a filter pattern comprising a plurality of pigment patterns of blue, red, green, etc. in high yield and in a reduced number of process. Namely, according to the conventional process of forming a plurality of pigment patterns, the processes of light-exposure and development are required to be repeated for forming each pigment pattern. By contrast, according to this invention, the processes of light-exposure and development are performed only in the formation of the first pigment pattern, and other pigment patterns are subsequently formed, without performing the process of light-exposure, by utilizing a difference in adhesion strength between a substrate and a pigment layer.

Namely, in a method of manufacturing a display screen according to the present invention, a first pigment layer is formed by coating a solution containing a first pigment on a surface of a substrate and by drying the resultant coated layer. Then, this first pigment layer is subjected to a patterned light exposure and developed forming a first pigment pattern. Then, a second pigment layer is formed by coating a solution containing a second pigment all over the surface of the substrate including a surface of said first pigment pattern and by drying the resultant coated layer.

Subsequently, the second pigment layer is rinsed to selectively remove a portion of the second pigment layer which is disposed on the first pigment pattern thereby to form a second pigment pattern. Through these processes, a filter pattern comprising a first pigment pattern and a second pigment pattern can be obtained. In this case, at least either one of the solution containing a first pigment and the solution containing a second pigment is formulated to contain an adhesion regulating agent so as to cause the adhesion strength between the first pigment pattern and the second pigment layer to become lower than the adhesion strength between the substrate and the second pigment layer, thus allowing a portion of the second pigment layer that is formed on the first pigment pattern to be selectively and easily removed.

This invention will be further explained with a specific example.

As for the pigment to be useful in this invention, any of inorganic or organic pigments may be employed. In particular, a pigment which is capable of being uniformly dispersed in a filter layer and giving a sufficient transparency to the filter layer without causing scattering of light is preferable.

Specific examples of such a pigment are as follows.

With respect to inorganic pigments, a ferric oxide type pigment such as Sicotrans Red L-2817 (trade name, particle diameter: 0.01 to 0.02 μm, BASF Co.) or an anthraquinone type pigment such as Cromophtal Red A2B (trade name, particle diameter: 0.01 μm, Ciba-Geigy Co.) may be used as a red pigment. As for blue pigment, cobalt aluminate type ($Al_2O_3$—CoO) pigment such as Cobalt Blue-X (trade name, particle diameter: 0.01 to 0.02 μm, Toyo Ganryo Co.), an ultramarine blue type pigment such as Ultamarine Blue No. 8000 (trade name, particle diameter: 0.01 μm, Dai-ichi Kasei Co.) or a phthalocyanine blue type pigment such as Lionol Blue-FG-7370 (trade name, particle diameter: 0.01 μm, Toyo Ink Co.) may be used. As for green pigment, a $TiO_2$—NiO—CoO—ZnO type pigment such as Daipyroxide TM-Green #3320 (trade name, particle diameter: 0.01 to 0.02 μm, Dainichi Seika Co.), a CoO—$Al_2O_3$—$Cr_2O_3$—$TiO_2$ type pigment such as Daipyroxide TM-Green #3340 (trade name, particle diameter: 0.01 to 0.02 μm, Dainichi Seika Co.), a CoO—$Al_2O_3$—$Cr_2O_3$ type pigment such as Daipyroxide TM-Green #3420 (trade name, particle diameter: 0.01 to 0.02 μm, Dainichi Seika Co.), a $Cr_2O_3$ type pigment such as ND-801 (trade name, particle diameter: 0.35 μm, Nihon Denko Co.), a chlorinated phthalocyanine green type pigment such as Fastogen Green S (trade name, particle diameter: 0.01 μm, Dainihon Ink Co.) or a brominated phthalocyanine green type pigment such as Fastogen Green 2YK (trade name, particle diameter: 0.01 μm, Dainihon Ink Co.) may be used.

With respect to organic pigments, an azolake type pigment such as Lake Red C (trade name, Dainichi Seika Co.) as a red pigment, a copper phthalocyanine type pigment such as Fastogen Blue-GNPS (trade name, Dainihon Ink Co.) as a blue pigment, and a chlorobrominated copper phthalocyanine type pigment such as Lionol Green 2Y-301 (trade name, Toyo Ink Co.) as a green pigment may be used.

In the manufacture of a pigment dispersion for forming a pigment layer, any of these pigments is mixed together with a dispersant, an adhesion regulating agent, a photoresist and pure water. It is possible to add not more than 5% by weight of a water-soluble organic solvent such as alcohol into pure water.

Examples of the dispersant for dispersing a pigment are anionic sodium salt dispersant, anionic ammonium salt dispersant and nonionic dispersant. Examples of anionic sodium salt dispersant are acrylic dispersant, acryl-styrene based dispersant, acrylic copolymer, polycarboxylic acid type dispersant and naphthalene sulfonic acid/formalin condensate. Specific examples of such a dispersant are Dispec N-40 (trade name, Allide Colloid Co.) which is an acrylic dispersant, Demol EP (trade name, Kaoh Co.) and Poise 520 (trade name, Kaoh Co.) both of which are a polycarboxylic acid type dispersant, Demol N (trade name, Kaoh Co.) which is a naphthalene sulfonic acid/formalin condensate, Demol MS (trade name, Kaoh Co.) which is a special aromatic sulfonic acid/formalin condensate, and Elenon No.19M (trade name) which is an octylphosphate monoethanol amine salt.

Examples of anionic ammonium salt dispersant are acrylic dispersant, acryl-styrene based dispersant, acrylic copolymer, polycarboxylic acid type dispersant and polyoxyethylene alkylether sulphate. Specific examples of such a dispersant are Dispec A-40 (trade name, Allide Colloid Co.) which is an acrylic dispersant, Discoat N-14 (trade name, Dai-ichi Kogyo Seiyaku Co.) which is a polycarboxylic acid type dispersant, Hitenol 08 (trade name, Dai-ichi Kogyo Seiyaku Co.) which is an ammonium salt of polyoxyethylene alkylether sulphate, and Lomer PWA (trade name, Sunnovko Co.) which is a naphthalene sulfonic acid condensate.

Examples of nonionic dispersant are polyoxyethylene laurylether, polyoxyethylene derivatives, polyoxyalkylene alkyl ether, polyoxyethylene nonylphenyl ether, and polyoxyethylene sorbitan monolaurate. Specific examples of such a nonionic dispersant are Noigen EA-140 (trade name, Dai-ichi Kogyo Seiyaku Co.), Emulgen 106 (trade name, Kaoh Co.) and Leodol TW-L120 (trade name, Kaoh Co.).

Examples of adhesion regulating agent are finegrain silica, Li-silicate, and fine-grain alumina. With respect to the fine-grain silica and fine-grain alumina, the particle diameter thereof should preferably be 0.1 μm or less.

As for the photoresist, a water-soluble photoresist such as ammonium dichromate (ADC)/polyvinyl alcohol (PVA), sodium dichromate (SDC)/(PVA), diazonium salt/PVA, stizoval type photoresist or ADC/casein may be used.

The concentration of the pigment in a pigment dispersion may be 0.1 to 50% by weight, preferably 1 to 50% by weight. If the concentration of the pigment is less than 0.1% by weight, the pigmentation of the pigment layer would become insufficient. If the concentration of the pigment is not less than 1% by weight, the pigmentation of the pigment layer would be clearly recognized. However, if the concentration of the pigment exceeds more than 50% by weight, the viscosity of the dispersion would become too high, thus making it very difficult to form a uniform layer thereof.

In the followings, the process of forming a pigment pattern and a liquid useful for the developing solution and rinsing solution will be explained. As for the liquid useful for the developing solution and rinsing solution, hot water or an aqueous alkaline solution will be preferably employed.

The formation of a pigment filter on the panel of a color picture tube may be performed in the following procedure.

First, a pigment dispersion containing a first pigment is coated on the inner surface of the face plate and then dried. The coating in this case may be performed with the inner surface of the face plate being kept upward, sideways or downward. Parameters such as the solid volume, viscosity and coating method of the pigment dispersion are suitably controlled to obtain a uniform coating of the pigment layer. The coating may be performed using a spin coating method, a dipping method, a flow coating method. The employment of spin coating method may be preferable for obtaining a uniform layer of a prescribed thickness. As for the drying method of the coated layer, a drying with shaking, with heater or with a dry air may be employed. Otherwise, a standing at room temperature for a long period of time may also be employed. As result of drying using any of these methods, a first pigment layer can be obtained.

It is also possible to form a patterned light-absorbing layer in advance on the inner surface of the face plate before the pigment layer is formed thereon. Then, through a shadow mask of a desired pattern, the pigment layer is exposed to light using for example a high pressure mercury lamp. Thereafter, the inner surface of the face plate is dipped in a developing solution for several seconds to perform the development thereof, thus forming the first pigment pattern.

Then, a pigment dispersion containing a second pigment is coated on the inner surface of the face plate and then dried, thus forming a second pigment layer. Subsequently, water for example is sprayed on the pigment layer to selectively remove only a portion of the second pigment layer that is deposited on the first pigment pattern, thus forming a second pigment pattern. In this manner, a filter pattern comprising the first and the second pigment patterns can be ultimately obtained.

According to the method of this invention as described above, it is possible to form a second pigment pattern by merely rinsing the second pigment layer after a solution containing a second pigment is coated all over the surface of the substrate without requiring the process of light exposure. In order to realize this method of this invention, it is very important to make a sufficient degree of difference in adhesivity between the adhesion between the second pigment layer and the substrate, and the adhesion between the second pigment layer and the first pigment layer. After an extensive studies, the present inventors have found the following facts.

Namely, it has been found that when the substrate is formed of glass, the patterning of the second pigment layer can be easily performed by a simple rinsing treatment if an adhesion regulating agent is added to at least either one of a first pigment layer and a second pigment layer. The effect of the adhesion regulating agent may be considered as follows. When the adhesion regulating agent is added to a pigment layer, the pigment layer can be charged to a prescribed electric charge (for example, fine-grain silica is charged into a negative charge, while Li-silicate and fine-grain alumina are charged into a positive charge). On the other hand, when the surface of the substrate is covered in advance with a silica or aminosilane film before a pigment layer is deposited thereon, the surface of the substrate can be charged to a prescribed electric charge (for example, silica is charged into a negative charge, while aminosilane is charged into a positive charge). Therefore, when the magnitudes of the electric charge of the first and the second pigment layers are controlled respectively to a predetermined value through the action of the adhesion regulating agent, it is possible to make a sufficient degree of difference in adhesivity between the adhesion between the second pigment layer and the substrate, and the adhesion between the second pigment layer and the first pigment layer.

Namely, when the adhesion strength between the first pigment pattern and the second pigment layer made lower than the adhesion strength between the substrate and the second pigment layer, it is possible to allow a portion of the second pigment layer which has been formed on the first pigment pattern to be selectively and easily removed, thus forming the second pigment pattern.

This invention will be further explained with reference to the drawings illustrating one embodiment where the first pigment layer is formed of a blue pigment layer and a green pigment layer, while the second pigment layer is formed of a red pigment layer.

FIGS. 1A to 1J illustrate sequentially a process of forming a filter pattern according to this invention. First, as shown in FIG. 1A, an aminosilane film (not shown) was deposited on the entire surface of a substrate 1 made of glass. Then, a light-absorbing layer 2 of a prescribed pattern and formed of fine particles of graphite was formed over the aminosilane film.

Then, the pigment dispersions, each consisting of following composition, were prepared for forming filter patterns of blue, green and red.

(Blue pigment dispersion)

Blue pigment: cobalt aluminate 30 wt % {Cobalt Blue-X (trade name, particle diameter: 0.01 to 0.02 μm, Toyo Ganryo Co.)}

Dispersant: ammonium polyacrylate copolymer 0.7 wt % {Dispec GA-40 (trade name, Allide Colloid Co.)}

Adhesion regulating agent: fine-grain silica (particle diameter: 0.08 μm) 3 wt %

Photoresist: ammonium dichromate (ADC)+polyvinyl alcohol (PVA) 0.5 wt %

(These component being dispersed in pure water)

(Green pigment dispersion)

Green pigment: $TiO_2$—NiO—CoO—ZnO 30 wt % {Daipyroxide TM-Green #3320 (trade name, particle diameter: 0.01 to 0.02 μm, Dainichi Seika Co.)}

Dispersant: sodium acrylate 0.7 wt % {Dispec N-40 (trade name, Allide Colloid Co.)}

Adhesion regulating agent: fine-grain silica (particle diameter: 0.08 μm) 3 wt %

Photoresist: ADC+PVA 0.5 wt %

(These component being dispersed in pure water)

(Red pigment dispersion)

Red pigment: fine-grain $Fe_2O_3$ 20 wt % (particle diameter: 0.01 to 0.02 μm)

Dispersant: ammonium salt of polyoxyethylene alkylether sulphate 0.7 wt %

{Hitenol 08 (trade name, Dai-ichi Kogyo Seiyaku co.)}

Adhesion regulating agent: fine-grain silica (particle diameter: 0.08 μm) 3 wt %

Photoresist: ADC+PVA 0.5 wt %

(These component being dispersed in pure water)

Figure 1B:
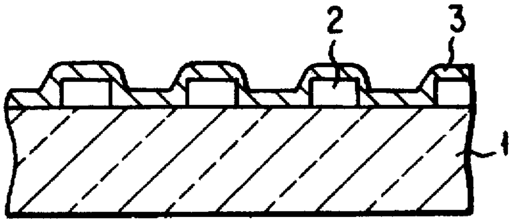
Figure 1C:
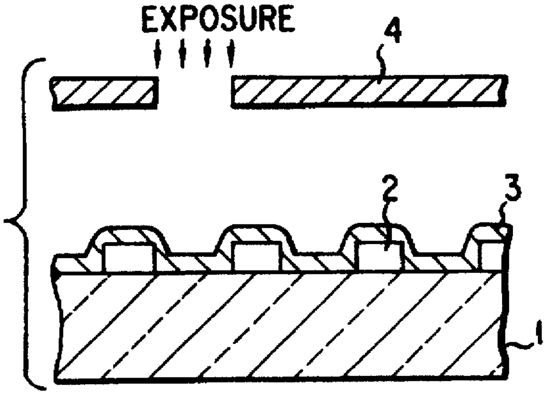
Figure 1D:
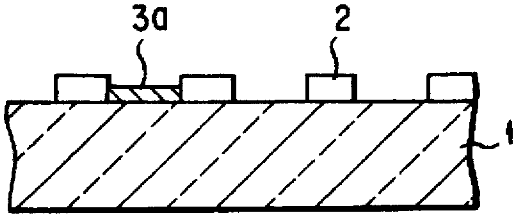

Then, as shown in FIG. 1B, the substrate 1 was kept at a temperature of 30° C., and the blue pigment dispersion was coated all over the substrate 1 provided with a light absorbing layer 2 to form a blue pigment layer 3. Subsequently, the substrate 1 was rotated at 100 to 300 rpm to shake off an excessive pigment dispersion. Then, the substrate 1 was heated at a heater temperature of 120° C. for 3 to 4 minutes to dry the pigment dispersion. Thereafter, the substrate 1 was subjected to a light exposure of prescribed pattern by using a high pressure mercury lamp with a color-screening electrode 4 being interposed therebetween as shown in FIG. 1C. Then, the substrate 1 was rinsed with a spray of mist-like water for example at a liquid pressure of 2 to 10 kg/cm$^2$ to obtain a blue pigment pattern 3*a* of a prescribe pattern as shown in FIG. 1D.

Figure 1E:
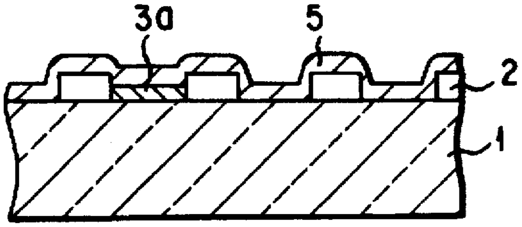
Figure 1F:
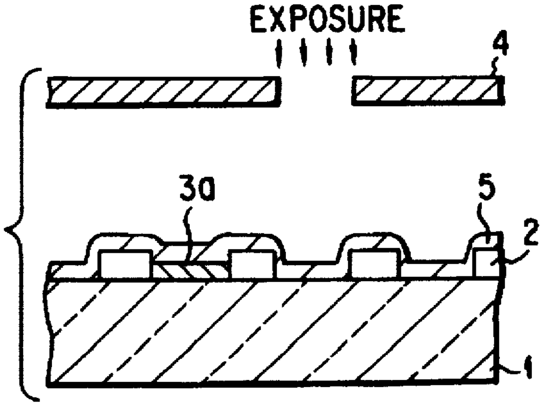
Figure 1G:
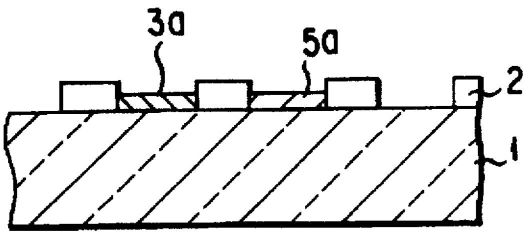

Then, the substrate 1 was kept at a temperature of 30° C., and the green pigment dispersion was coated all over the substrate 1 to form a green pigment layer 5 as shown in FIG. 1E. Subsequently, the substrate 1 was rotated at 100 to 300 rpm to shake off an excessive pigment dispersion. Then, the substrate 1 was heated at a heater temperature of 120° C. for 3 to 4 minutes to dry the pigment dispersion. Thereafter, the substrate 1 was subjected to a light exposure of prescribed pattern by using a high pressure mercury lamp with a color-screening electrode 4 being interposed therebetween as shown in FIG. 1F. Then, the substrate 1 was rinsed with a spray of mist-like water for example at a liquid pressure of 2 to 10 kg/cm$^2$ to obtain a green pigment pattern 5*a* of a prescribe pattern as shown in FIG. 1G.

Figure 1H:
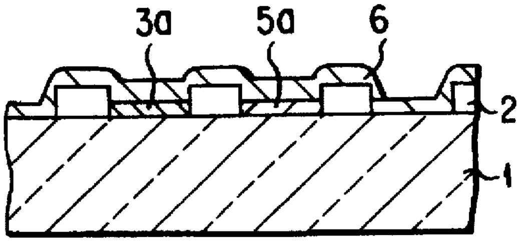
Figure 1I:
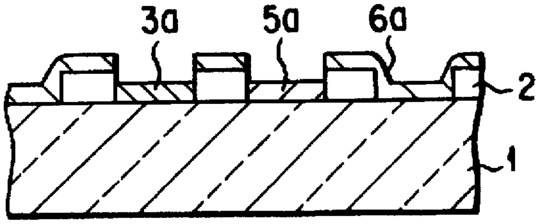
Figure 1J:
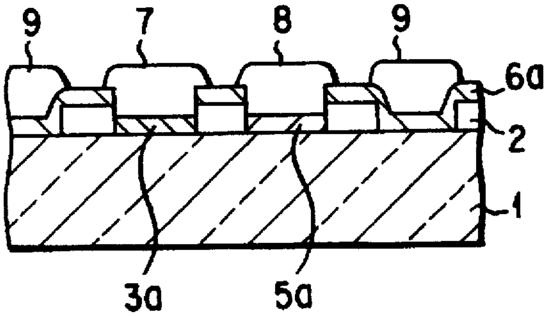
Figure 2:
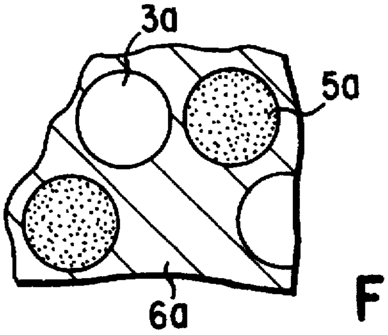
FIG. 2 is a plan view showing a filter pattern formed by the process shown in FIGS. 1A to 1J.

Then, the substrate 1 was kept at a temperature of 30° C., and the red pigment dispersion was coated all over the substrate 1 to form a red pigment layer 6 as shown in FIG. 1H. Subsequently, the substrate 1 was rotated at 100 to 300 rpm to shake off an excessive pigment dispersion. Then, the substrate 1 was heated at a heater temperature of 120° C. for 3 to 4 minutes to dry the pigment dispersion. Then, the substrate 1 was rinsed with a spray of mist-like water for example at a liquid pressure of 2 to 10 kg/cm$^2$ to obtain a red pigment pattern 6*a* of a prescribe pattern as shown in FIG. 1I.

As a result, a pigment layer comprising the blue pigment pattern 3*a*, the green pigment pattern 5*a* and the red pigment pattern 6*a* was formed on the substrate 1.

In the example explained above, since the entire surface of the substrate 1 was covered with an aminosilane film, and at the same time a fine-grain silica was included in the blue pigment pattern 3*a*, the green pigment pattern 5*a* and the red pigment pattern 6*a*, the substrate was charged into a positive charge (+), while the blue pigment pattern 3*a*, the green pigment pattern 5*a* and the red pigment pattern 6*a* were charged into a negative charge (−), respectively. As a result, the adhesive strength between red pigment pattern 6*a* and the substrate 1 was made sufficiently larger than the adhesive strength between the red pigment pattern 6*a* and the blue pigment pattern 3*a*, or between the red pigment pattern 6*a* and the green pigment pattern 5*a*, so that only a portion of the red pigment pattern 6*a* that was disposed on the blue pigment pattern 3*a* and on the green pigment pattern 5*a* was removed. Namely, the red pigment pattern 6*a* was formed only on a region of the substrate 1 where any of the blue pigment pattern 3*a* and on the green pigment pattern 5*a* was not disposed. Therefore, the process of light-exposure was not required in the formation of the red pigment pattern 6*a* in contrast to the conventional method requiring the process. Accordingly, the process of forming a color filter was much simplified by the above method.

Then, according to the conventional method, a blue fluorescent material layer 7, a green fluorescent material layer 8 and a red fluorescent material layer 9 were formed in conformity with the blue pigment pattern 3*a*, the green pigment pattern 5*a* and the red pigment pattern 6*a*, respectively.

With these processes, a filter-attached fluorescent layer having a pigment layer and a fluorescent material layer, each disposed on a substrate 1, was obtained. A color picture tube mounting this filter-attached fluorescent layer was confirmed to be excellent in contrast and color purity. Moreover, since the filter pattern was formed only on a prescribed portion, i.e. for example a blue pigment pattern was accurately formed on a limited area where a blue fluorescent material layer is to be subsequently formed, a mixture of color was not generated, thus realizing a filter excellent in color purity.

The following features can be noted as other embodiments of this invention.

(a) When a film consisting of aminosilane is formed on the substrate.

An adhesion regulating agent is not added to a blue pigment dispersion as well as to a green pigment dispersion, but added only to a red pigment dispersion.

(b) When a film consisting of silica is formed on the substrate.

1. Li-silicate or fine-grain alumina is added to all of a blue pigment dispersion, a green pigment dispersion and a red pigment dispersion.

2. An adhesion regulating agent is not added to a blue pigment dispersion as well as to a green pigment dispersion, but Li-silicate or fine-grain alumina is added only to a red pigment dispersion.

In the above example, the first pigment layer is defined as being formed of a blue pigment layer and a green pigment layer, while the second pigment layer is defined as being formed of a red pigment layer. However, this invention is not limited to this combination, but the second pigment layer may be either a blue pigment layer or a green pigment layer. Further, it is possible to apply this invention to the color filter of a liquid crystal display device.

Further, where each pigment layer is patterned, the substrate is immersed in, for example, an alkali developing agent before spraying of mist-like water, thus enabling certainly removal of unnecessary portion of each pigment layer.

As explained above, since an adhesion regulating agent is added at least either one of a solution containing a first pigment or a solution containing a second pigment, it has become possible to selectively remove only a portion of a second pigment layer which is disposed on a first pigment layer without necessitating the process of light-exposure. Accordingly, a filter pattern can be manufactured in more simplified manner and in high yield by this invention as compared with the conventional method.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing a display screen provided with a filter pattern comprising a first pigment pattern and a second pigment pattern, which comprises the steps of;

forming a first pigment layer by coating a solution containing a first pigment on a surface of a substrate and drying the resultant coated layer;

forming a first pigment pattern by subjecting said first pigment layer to a patterned light exposure and developing the resultant exposed pattern;

forming a second pigment layer by coating a solution containing a second pigment on the surface of the substrate including a surface of said first pigment pattern; and forming a second pigment pattern by selectively removing, through rinsing, a portion of said second pigment which is disposed on said first pigment pattern;

an adhesion regulating agent being contained in at least either one of said solution containing a first pigment and said solution containing a second pigment.

2. The method according to claim 1, wherein said substrate has a film consisting essentially of silica or aminosilane formed thereon.

3. The method according to claim 1, wherein said adhesion regulating agent is selected from the group consisting of fine-grain silica, Li-silicate and fine-grain alumina.

4. The method according to claim 3, wherein each of said fine-grain silica and fine-grain alumina has a particle diameter of 0.1 μm or less.

5. The method according to claim 1, wherein said adhesion regulating agent is included in the solution at a ratio of 10 to 60% by weight.

6. The method according to claim 1, wherein said solution containing a first pigment contains a photosensitive resin.

7. The method according to claim 1, which further comprises a step of forming a light-absorbing pattern on the substrate before the first pigment layer is formed.

8. The method according to claim 1, wherein each of said solution containing a first pigment and said solution containing a second pigment contains a dispersant.

9. The method according to claim 1, wherein a film consisting essentially of aminosilane is formed on an entire surface of the substrate, an adhesion regulating agent is not added to said solution containing a first pigment, but fine-grain silica is added to said solution containing a second pigment.

10. The method according to claim 1, wherein a film consisting essentially of silica is formed on the substrate, and Li-silicate or fine-grain alumina is added to said solution containing a first pigment and to said solution containing a second pigment.

11. The method according to claim 1, wherein a film consisting essentially of silica is formed on an entire surface of the substrate, and an adhesion regulating agent is not added to said solution containing a first pigment, and Li-silicate or fine-grain alumina is added to said solution containing a second pigment.

12. The method according to claim 1, wherein each of said solution containing a first pigment and said solution containing a second pigment contains the pigment at a ratio of 0.1 to 50% by weight.

13. The method according to claim 1, wherein each of said solution containing a first pigment and said solution containing a second pigment contains the pigment at a ratio of 1 to 50% by weight.

14. The method according to claim 1, which further comprises a step of forming, after the formation of said second pigment pattern, a first and a second fluorescent material patterns on said first pigment pattern and said second pigment pattern.

* * * * *